US009643590B2

(12) United States Patent
Gibson et al.

(10) Patent No.: US 9,643,590 B2
(45) Date of Patent: May 9, 2017

(54) METHODS AND SYSTEM FOR SHIFTING A HYBRID VEHICLE (71) Applicant: Ford Global Technologies, LLC, Dearborn, MI (US)

(72) Inventors: Alexander O'Connor Gibson, Ann Arbor, MI (US); Felix Nedorezov, Rochester Hills, MI (US); Matthew John Shelton, Grosse Ile, MI (US); Stuart N. Ford, Farmington Hills, MI (US); Todd McCullough, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 14/685,937

(22) Filed: Apr. 14, 2015

(65) Prior Publication Data

US 2016/0304075 A1 Oct. 20, 2016

(51) Int. Cl.
*B60W 30/19* (2012.01)
*B60W 10/02* (2006.01)
*B60W 10/06* (2006.01)
*B60W 10/08* (2006.01)
*B60W 20/00* (2016.01)
(Continued)

(52) U.S. Cl.
CPC ............ *B60W 20/00* (2013.01); *B60W 10/02* (2013.01); *B60W 10/06* (2013.01); *B60W 10/08* (2013.01); *B60W 20/40* (2013.01); *B60W 30/19* (2013.01); *B60W 30/20* (2013.01); *B60W 2510/025* (2013.01); *B60W 2510/0275* (2013.01); *B60W 2510/105* (2013.01); *B60W 2510/1005* (2013.01); *B60W 2510/1045* (2013.01);
(Continued)

(58) Field of Classification Search
CPC .... B60W 10/02; B60W 10/026; B60W 10/06; B60W 10/08; B60W 10/11; B60W 20/15; B60W 20/30; B60W 20/50; B60W 30/19; B60W 30/20; B60W 2510/0275; B60W 2510/1005; B60W 2510/1045; B60W 2510/105; B60W 2710/083; B60W 2710/0666
See application file for complete search history.

(56) References Cited

U.S. PATENT DOCUMENTS 5,212,998 A    5/1993 Testerman
5,468,196 A *  11/1995 Minowa ................ B60W 10/02
                                                477/107
(Continued)

OTHER PUBLICATIONS

Nefcy, B. et al.,"Methods and System for Downshifting During Regeneration," U.S. Appl. No. 14/685,900, filed Apr. 14, 2015, 30 pages.
(Continued)

*Primary Examiner* — Ramya Burgess
*Assistant Examiner* — David Morris
(74) *Attorney, Agent, or Firm* — David Kelley; McCoy Russell LLP (57) ABSTRACT Systems and methods for shifting a transmission of a hybrid driveline that include a torque converter with a lockup clutch are presented. The systems and methods may adjust a feedforward motor torque command to match application of motor torque to a time that a gear clutch closes so that shifting may be improved and so that driveline torque disturbances may be less noticeable.

18 Claims, 7 Drawing Sheets

(51) Int. Cl.
*B60W 20/40* (2016.01)
*B60W 30/20* (2006.01)

(52) U.S. Cl.
CPC ............... *B60W 2710/0666* (2013.01); *B60W 2710/083* (2013.01); *Y10S 903/93* (2013.01)

(56) References Cited

U.S. PATENT DOCUMENTS

| | | | | |
|---|---|---|---|---|
| 5,501,109 | A * | 3/1996 | Naito | B60L 3/102 73/114.15 |
| 6,435,049 | B1 | 8/2002 | Janesek et al. | |
| 7,676,313 | B2 | 3/2010 | Ortmann et al. | |
| 8,672,803 | B2 * | 3/2014 | Tamba | B60K 6/105 477/5 |
| 8,834,319 | B2 * | 9/2014 | Nefcy | B60W 10/02 180/65.23 |
| 2010/0108032 | A1 * | 5/2010 | Pursifull | B60W 10/06 123/406.12 |
| 2010/0273604 | A1 * | 10/2010 | Imaseki | B60K 6/365 477/5 |

OTHER PUBLICATIONS

Nefcy, B. et al., "Input Torque Trim for Transmission Shift Control During Regenerative Braking," U.S. Appl. No. 14/686,054, filed Apr. 14, 2015, 22 pages.

* cited by examiner

METHODS AND SYSTEM FOR SHIFTING A HYBRID VEHICLE

FIELD

The present description relates to methods and a system for shifting gears of hybrid vehicle fixed gear ratio transmission. The methods and systems may be particularly useful for hybrid vehicles that include a driveline disconnect clutch.

BACKGROUND AND SUMMARY

A hybrid vehicle may include an internal combustion engine and an electric motor to propel the vehicle. The motor may be selectively coupled to the engine via a driveline disconnect clutch. The motor may be used at lower driver demand torque levels while the engine, or engine and motor, may operate at higher driver demand torque levels. If the motor is the sole vehicle torque source providing torque to propel the vehicle, it may be desirable to operate the vehicle driveline as efficiently as possible to extend the vehicle's operating range. One way to increase driveline operating efficiency is to lock a torque converter clutch of a torque converter that may be positioned downstream of the motor and engine and upstream of transmission gears. However, the torque converter dampens driveline torque disturbances and provides torque multiplication when the torque converter clutch is not locked. One type of driveline torque disturbance that may be dampened via the torque converter is transmission gear shifting torque disturbances. Gear shifting torque disturbances may be attenuated via the torque converter if the torque converter clutch is in an open state. However, the driveline efficiency may be reduced if the torque converter clutch is open during transmission gear shifting, thereby reducing the range the motor may propel the vehicle.

The inventors herein have recognized the above-mentioned issues and have developed a driveline operating method, comprising: propelling a vehicle via a motor in a driveline with an open disconnect clutch and a locked torque converter clutch; adjusting a torque output command of the motor via transmission output shaft feedback in response to fixed ratio transmission gear shift; and operating the motor based on the adjusted torque output command.

By adjusting motor torque in response to transmission output shaft acceleration or torque, it may be possible to provide the technical result of reducing driveline torque disturbances during gear shifting of a fixed ratio transmission while a torque converter clutch is locked. In one example, transmission output shaft torque feedback may be a basis for aligning a transmission input torque with closing time of an on-coming clutch. Aligning the transmission input torque with on-coming clutch closing time may reduce driveline torque disturbances due to transmission gear shifting. Further, by holding the torque converter lockup clutch in a closed state, transmission efficiency may be improved. Consequently, it may be possible for the motor to propel the vehicle further when transmission output shaft torque or acceleration is applied as feedback to a transmission input command torque.

The present description may provide several advantages. Specifically, the approach may provide improve vehicle energy efficiency. Additionally, the approach may reduce driveline torque disturbances during transmission gear shifting. Further, the approach may be selectively applied when driveline dampening to reduce engine torque pulsations is not desired.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
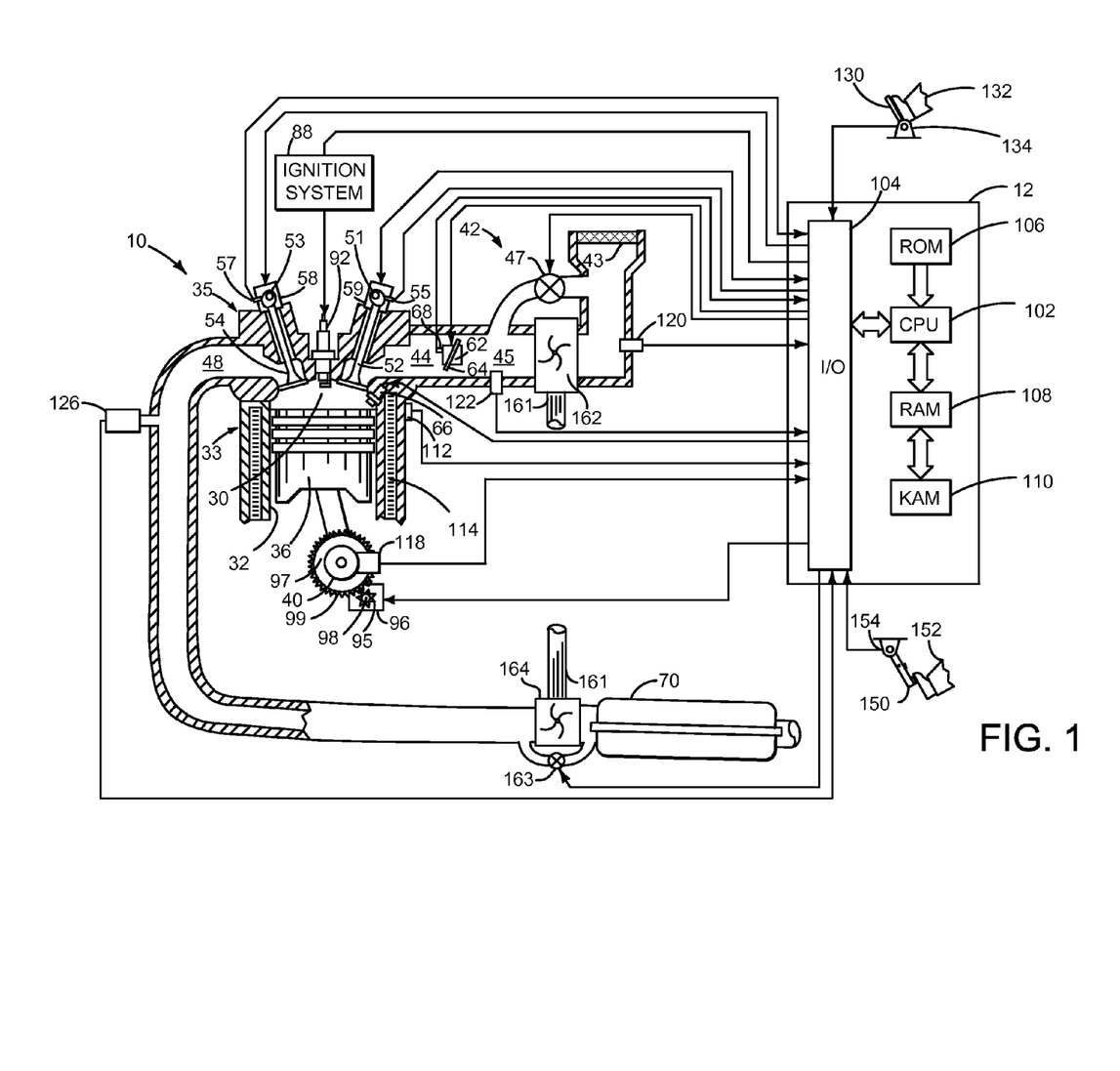
FIG. 1 is a schematic diagram of an engine.
Figure 2:
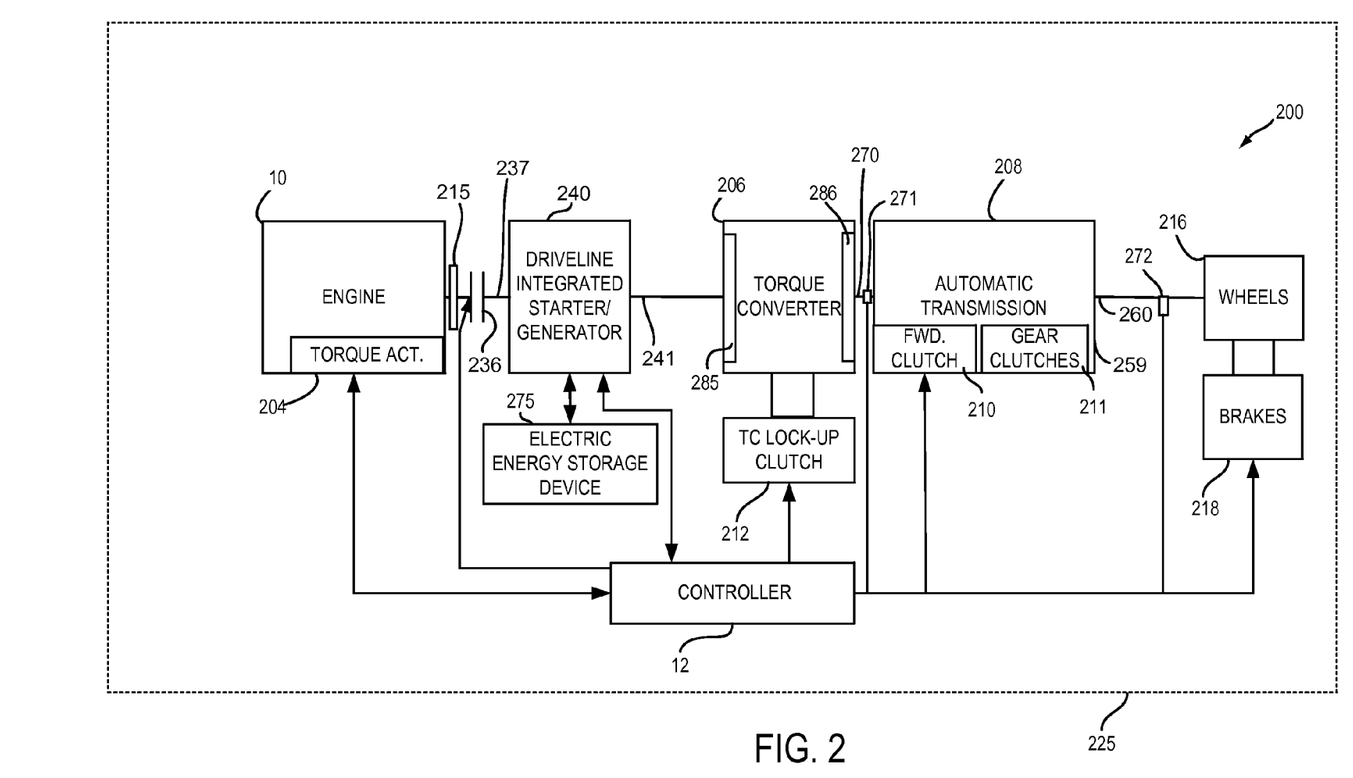
FIG. 2 is a schematic diagram of a hybrid vehicle driveline.
Figure 3A:
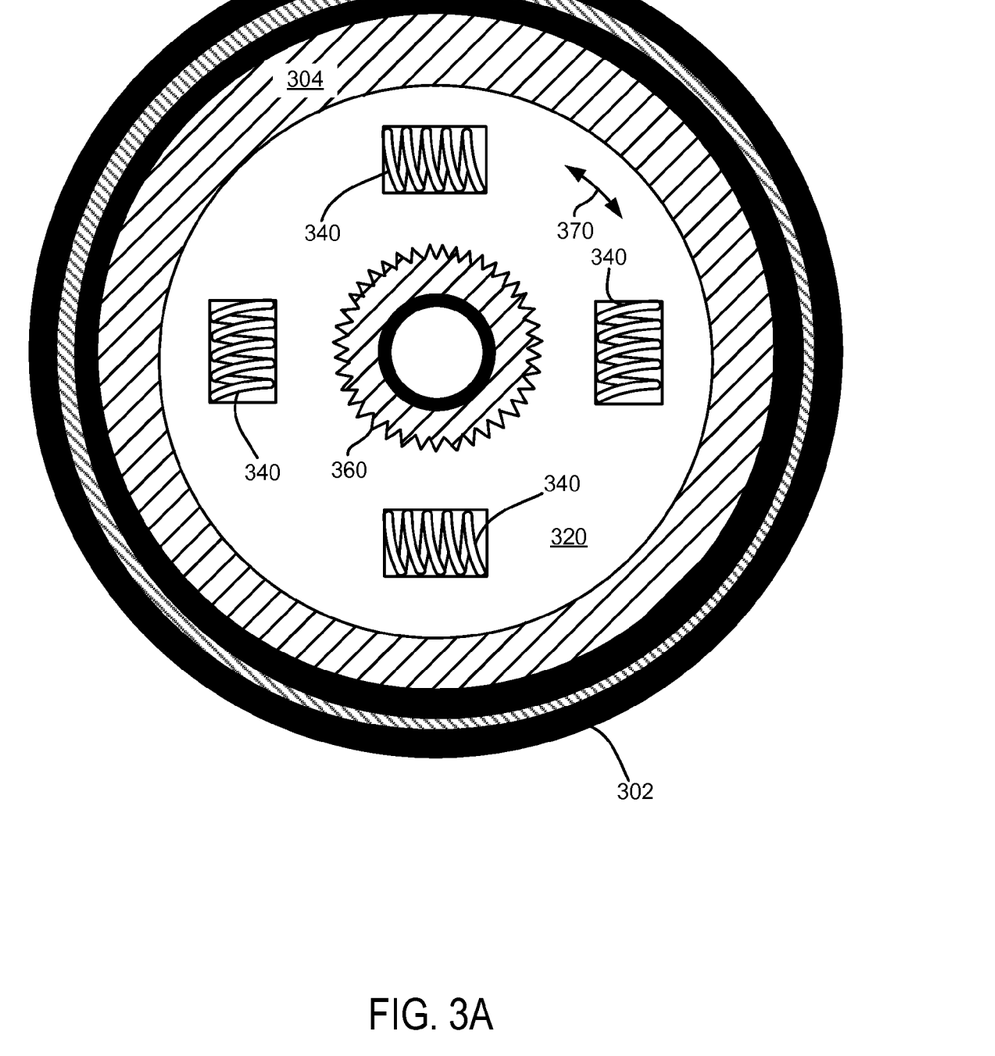
FIG. 3A is a plan view of a torque converter clutch assembly that includes dampening springs.
Figure 3B:
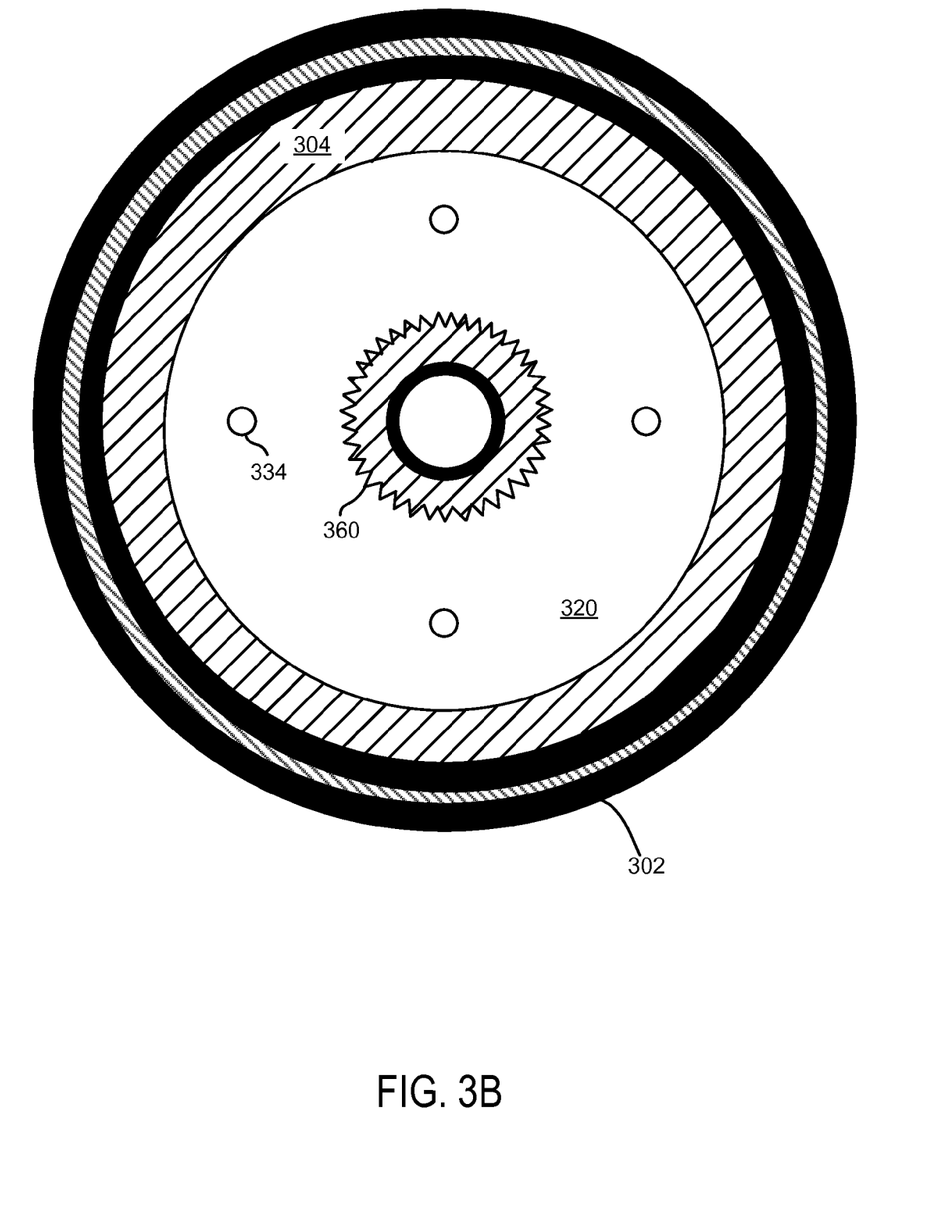
FIG. 3B is a plan view of a torque converter clutch assembly that does not include dampening springs.

The present description is related to controlling a driveline of a hybrid vehicle during gear shifting. The hybrid vehicle may include an engine as is shown in FIG. 1. The engine of FIG. 1 may be included in a powertrain or driveline as is shown in FIG. 2. The driveline may include a torque converter clutch or lockup clutch with or without dampening springs as is shown in FIGS. 3A and 3B. The driveline may include controls based on the block diagrams of FIGS. 4 and 5. The driveline may be operated according to the method shown in FIG. 6.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 receives transmission input shaft position via position sensor 271. Controller 12 may convert transmission input shaft position into input shaft speed via differentiating a signal from position sensor 271. Controller 12 may receive transmission output shaft torque from torque sensor 272. Alternatively, sensor 272 may be a position sensor or torque and position sensors. If sensor 272 is a position sensor, controller 12 differentiates a position signal to determine transmission output shaft velocity. Controller 12 may also differentiate transmission output shaft velocity to determine transmission output shaft acceleration.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

The system of FIGS. 1 and 2 provides for a system, comprising: an engine; a motor; a disconnect clutch positioned in a driveline between the engine and the motor; a torque converter including a lockup clutch coupled to the motor; and a controller including executable instructions stored in non-transitory memory for adjusting a motor torque command during a first transmission gear shift in response to a transmission output shaft parameter while the lockup clutch is closed and while the disconnect clutch is open. The system includes where the output shaft parameter is output shaft acceleration. The system further comprises additional instructions to not adjust the motor torque command during a second transmission gear shift in response to the transmission output shaft parameter. The system further comprises additional instructions to open the disconnect clutch during the second transmission gear shift. The system further comprises additional instructions to cease adjusting the motor torque command in response to the transmission output shaft parameter in response to an end of the first transmission gear shift. The system further comprises additional instructions to provide a feedback adjusted transmission input torque responsive to the transmission output shaft parameter.

Referring now to FIG. 3A, a plan view of a torque converter lockup clutch 212 including dampening springs is shown. Driven clutch plate 302 may be selectively engaged with drive clutch plate 304 via hydraulic actuation. Driven clutch plate 302 may rotate with respect to drive clutch plate 304 when the torque converter clutch is not locked. Drive clutch plate 304 may move rotationally in the directions indicated by arrow 370 relative to drive hub 320. Springs 340 couple drive clutch plate 304 to drive hub 320 allowing rotational compliance as indicated by arrow 370. Drive hub 320 is mechanically coupled to a drive shaft (not shown) via teeth 360. Thus, when drive clutch plate 304 engages driven clutch plate 302, springs 340 may dampen torque converter clutch oscillations that may develop between driven clutch plate 302 and drive clutch plate 304. In this way, the torque converter clutch may exhibit rotational compliance to provide driveline dampening.

Referring now to FIG. 3B, a plan view of a torque converter lockup clutch 212 not including dampening springs is shown. Driven clutch plate 302 may be selectively engaged with drive clutch plate 304 via hydraulic actuation. Driven clutch plate 302 may rotate with respect to drive clutch plate 304 when the torque converter clutch is not locked. Drive clutch plate 304 is stationary, with respect to, and directly coupled to, drive hub 320. Drive hub 320 is mechanically coupled to a drive shaft (not shown) via teeth 370. Thus, when drive clutch plate 304 engages driven clutch plate 302, there is no compliance between drive hub 320 and drive clutch plate 304. Therefore, the torque converter clutch rotational compliance may be reduced so that the driveline has less dampening as compared to the torque converter lockup clutch shown in FIG. 3A. The torque converter lockup clutch of FIG. 3B may be desirable for improving transmission gear shifting when power is delivered to the transmission solely via the motor. Because the motor provides torque to the transmission with less amplitude variation than the engine, the driveline may operate smooth (e.g., with little torque disturbance noticeable by a driver) even when there is less compliance within the driveline. Further, gear clutch slip and torque transfer observability may increase or improve when less driveline compliance is present via the absence of torque converter clutch dampening springs.

Figure 4:
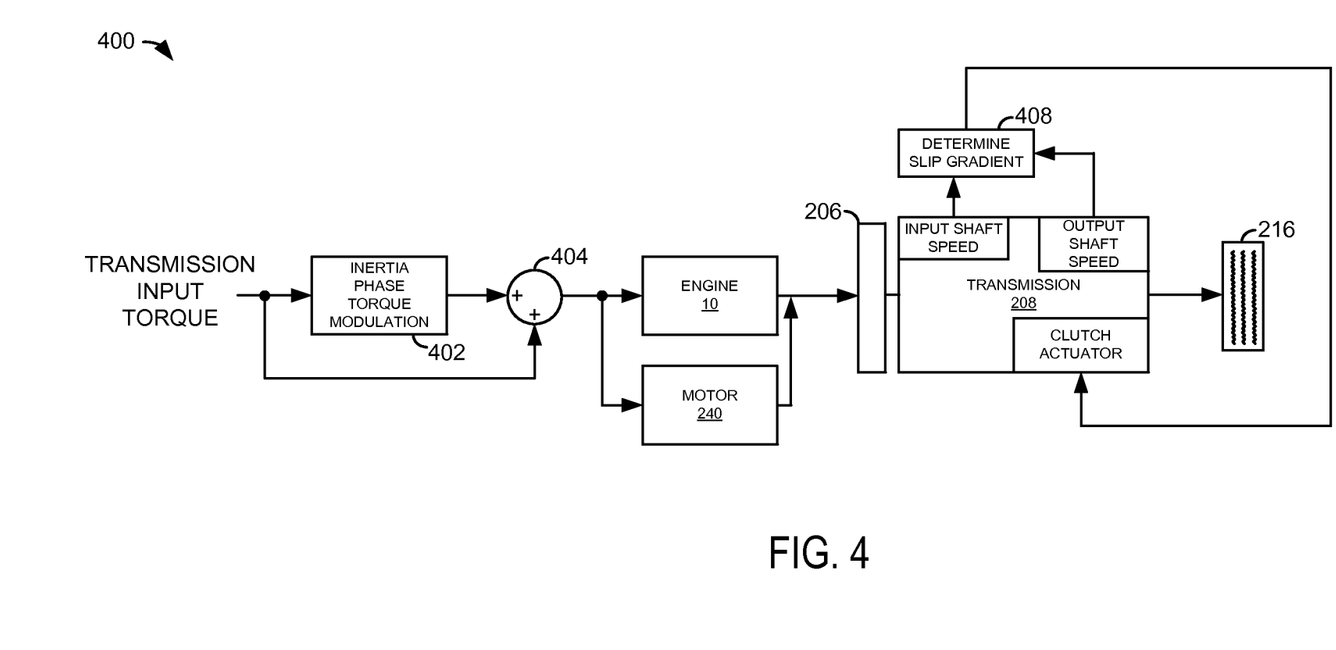
FIG. 4 shows an example control block diagram for supplying torque to a transmission during a gear shift when a driveline disconnect clutch is closed.

Referring now to FIG. 4, a block diagram is shown of a control method to operate a vehicle driveline when a driveline disconnect clutch is closed, the torque converter clutch is unlocked, and during a transmission gear shift. The controller of FIG. 4 may be included in the system of FIGS. 1 and 2 as executable instructions stored in non-transitory memory.

Desired transmission input torque is input at the left side of the block diagram. In one example, the desired transmission torque is based on driver demand torque as determined from accelerator pedal position and vehicle speed. For example, the driver demand torque may be converted to a desired wheel torque, and the desired wheel torque may be converted to a desired transmission input torque by multiplying the wheel torque by the axle gear ratio, the transmission gear ratio, and the torque converter transfer function. Alternatively, the driver demand torque may be converted directly to a desired transmission input torque.

The desired transmission input is used to index a table or function 402 that outputs a feed forward transmission input torque based on the desired transmission input torque during the transmission gear shift (e.g., an upshift to a higher gear ratio or a downshift to a lower gear ratio). The table or function outputs a value that is based on the desired transmission input torque and the time since the gear shift inertia phase began (e.g., beginning of closing of the on-coming clutch). The values in the table or function may be based on an expected slip gradient of the on-coming clutch (e.g., the rate of on-coming clutch slip). The feed forward transmission input torque is added to the desired transmission input torque at summing junction 404. The torque command resulting from summing junction 404 is allocated between engine 10 and motor 240. In one example, the power provided by the engine and the motor is based on an amount of charge stored in a battery supplying power to the motor.

Engine 10 and/or motor 240 supply torque to torque converter 206 which is unlocked for transmission gear shifting when the driveline disconnect clutch is closed. The torque converter 206 dampens engine torque pulsations caused by combustion events in engine cylinders. Further, the dual mass flywheel shown in FIG. 2 supplies some dampening to the driveline during transmission gear shifting when the driveline disconnect clutch is closed. Controller 12 determines transmission input shaft speed and transmission output shaft speed from transmission position sensors. Controller 12 determines a slip gradient of the on-coming clutch at 308. The slip gradient begins at 100 percent for a fully open on-coming clutch and ends at zero percent for a fully closed on-coming clutch. In one example, the slip gradient may be determined based on on-coming clutch slip at two different times during the transmission gear shift. The slip gradient is the rate of change in on-coming clutch slip. On-coming clutch slip may be determined by subtracting transmission output speed from transmission input speed and dividing the result by the transmission input speed. The slip gradient is compared against a desired slip gradient based on the time since start of the gear shift and difference between the desired slip gradient and the actual slip gradient multiplies a clutch actuator command to adjust the on-coming clutch application pressure via a gear clutch solenoid.

Thus, the method of FIG. 4 adjusts a transmission input torque via a feed forward transmission input torque to control transmission input torque. Also, on-coming clutch application pressure is adjusted in response to an on-coming clutch slip gradient. The open torque converter lockup clutch provides dampening to the system and the on-coming clutch actuator feedback adjusts clutch application pressure to align on-coming clutch closing time with a time the transmission input torque reaches a torque that provides a transmission output torque equivalent or slightly greater than a transmission output torque immediately before the gear shift was initiated.

Figure 5:
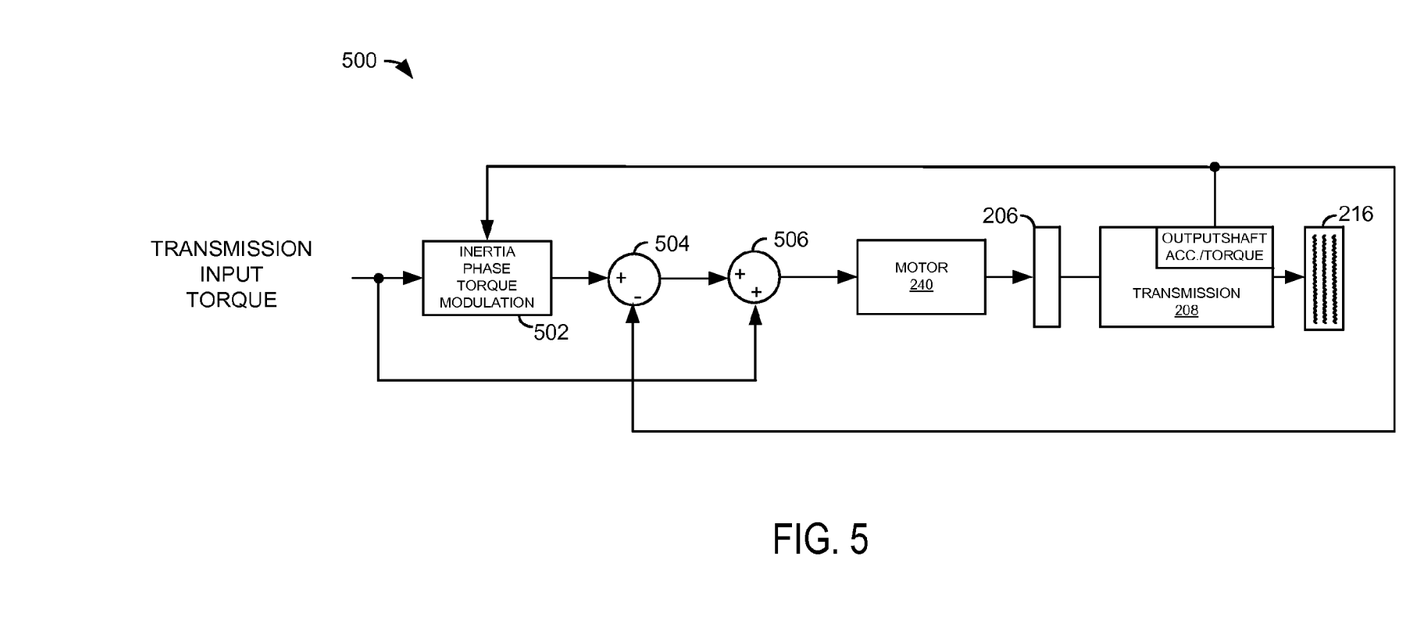
FIG. 5 shows an example control block diagram for supplying torque to a transmission during a gear shift when a driveline disconnect clutch is open.

Referring now to FIG. 5, a block diagram is shown of a control method to operate a vehicle driveline when a driveline disconnect clutch is open, the torque converter clutch is locked (e.g., less than a threshold speed difference between torque converter input speed and output speed), and during a transmission gear shift. The controller of FIG. 5 may be included in the system of FIGS. 1 and 2 as executable instructions stored in non-transitory memory.

Desired transmission input torque is input at the left side of the block diagram. In one example, the desired transmission torque is based on driver demand torque as determined from accelerator pedal position and vehicle speed. For example, the driver demand torque may be converted to a desired wheel torque, and the desired wheel torque may be converted to a desired transmission input torque by multiplying the wheel torque by the axle gear ratio, the transmission gear ratio, and the torque converter transfer function. Alternatively, the driver demand torque may be converted directly to a desired transmission input torque.

The desired transmission input torque is used to index a table or function 502 that outputs a feedback adjusted on-coming clutch modulation torque based on the desired transmission input torque during the transmission gear shift (e.g., an upshift to a higher gear ratio or a downshift to a lower gear ratio) and transmission output shaft acceleration or torque. The values in the table or function may be based on transmission output shaft acceleration or torque. Alternatively, the transmission input torque may be multiplied by the values in the tables. Thus, the values in the tables may be a gain. Transmission output shaft torque or acceleration is subtracted from the feedback adjusted on-coming clutch modulation torque at summing junction 504 to provide a feedback on-coming clutch error torque. The feedback on-coming clutch error torque is added to the desired transmission input torque at summing junction 506 resulting in a commanded feedback adjusted transmission input torque. It should be noted that transmission output shaft torque or transmission output acceleration may be feedback to 502 and 504; however, it may be preferable to feedback transmission output shaft torque since transmission torque is being controlled.

Motor 240 supplies torque to torque converter 206 based on the commanded feedback adjusted transmission input torque. The torque converter clutch is locked in the mode where motor 240 is the sole source of torque to the driveline. The locked torque converter 206 has less tendency to dampen driveline torque disturbances, but motor torque does not include cylinder torque pulsations like engine torque does. The torque converter clutch may or may not include dampening springs. However, it may be more desirable to not include dampening springs since the springs may make on-coming clutch torque observations more difficult. Controller 12 determines transmission output shaft torque or acceleration from transmission position and/or torque sensors.

Thus, the method of FIG. 5 adjusts a transmission input torque via a feedback transmission output shaft torque to control transmission input torque. Also, in some examples, the on-coming clutch application pressure or torque may be adjusted in response to an on-coming clutch slip gradient as is described in FIG. 4 at 408. The closed torque converter lockup clutch provides improved driveline efficiency for operating the driveline in a motor only mode. The controllers shown in FIGS. 4 and 5 are applied in response to transmission gear shifting and cease operation when transmission gear shifting is complete.

Figure 6:
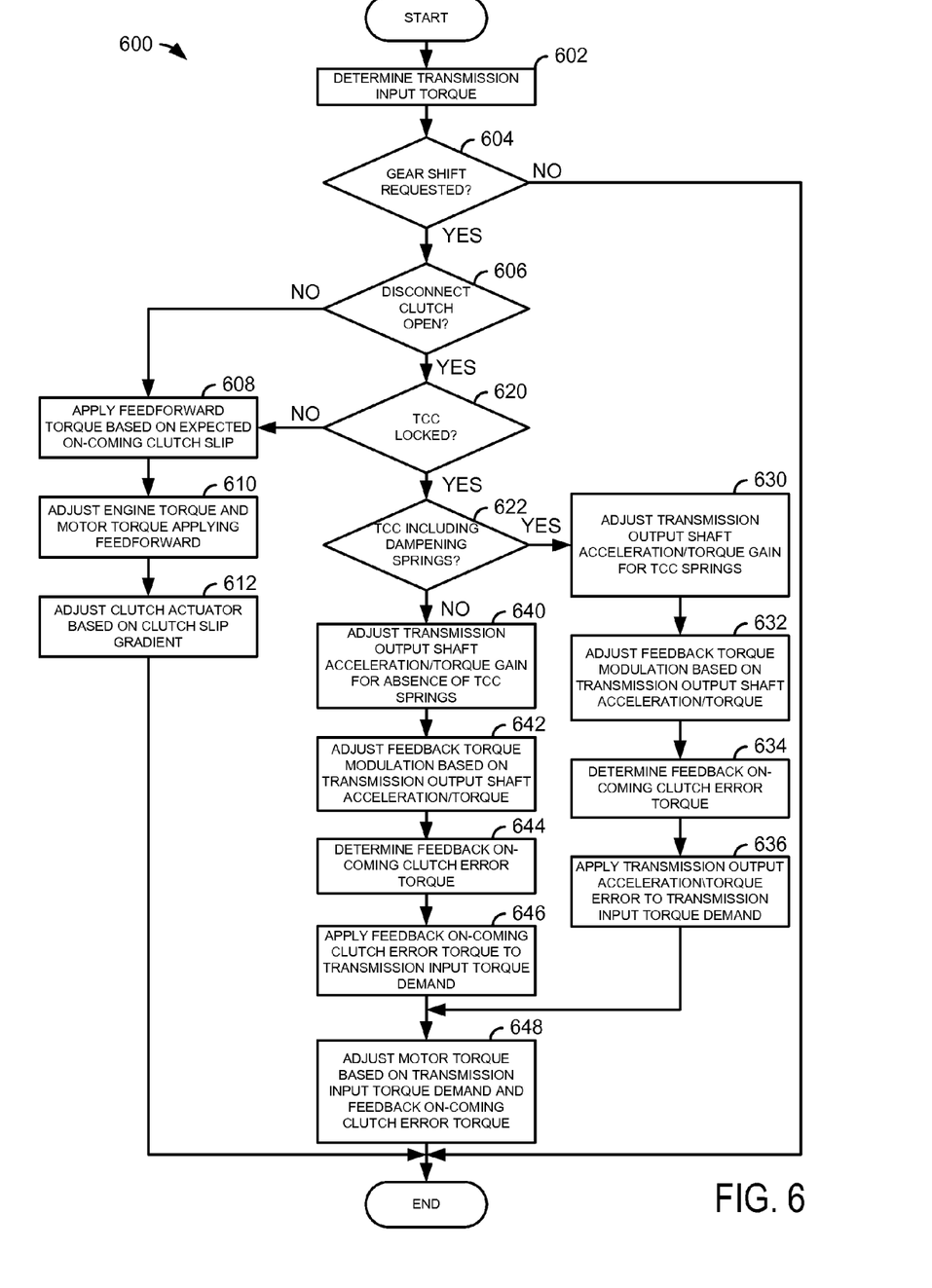
FIG. 6 shows a method for operating a vehicle driveline.

Referring now to FIG. 6, a method for operating a vehicle driveline is shown. The method of FIG. 6 may be included in the system of FIGS. 1 and 2 as executable instructions stored in non-transitory memory.

At 602, method 600 determines a desired transmission input torque. In one example, the desired transmission input torque is based on driver demand torque as determined from accelerator pedal position and vehicle speed. For example, the driver demand torque may be converted to a desired wheel torque, and the desired wheel torque may be converted to a desired transmission input torque by multiplying the wheel torque by the axle gear ratio, the transmission gear ratio, and the torque converter transfer function. Alternatively, the driver demand torque may be converted directly to a desired transmission input torque. Method 600 proceeds to 604 after desired transmission input torque is determined.

At 604, method 600 judges if a transmission gear ratio shift of a fixed ratio transmission is requested. In one example, a transmission gear shift may be requested in response to vehicle speed and driver demand torque. If method 600 judges that a transmission gear shift is requested, the answer is yes and method 600 proceeds to 606. Otherwise, the answer is no and method 600 proceeds to exit.

At 606, method 600 judges if the driveline disconnect clutch is open. Method 600 may determine whether or not a driveline disconnect clutch is open based on a value of a bit in memory, pressure of hydraulic fluid supplied to the driveline disconnect clutch, or driveline disconnect clutch position. If method 600 judges that the disconnect clutch is not open, the answer is no and method 600 proceeds to 608. Otherwise, the answer is yes and method 600 proceeds to 620.

At 608, method 600 applies feedforward torque to the desired torque. The feedforward torque may be based on an expected on-coming clutch slip gradient, but feedback is not applied. The feedforward value may be additive or multiplicative. In one example, the feedforward gain or additive value is empirically determined and stored in tables or functions that output the feedforward torque based on time since the gear shift request or the gear shift started. Method 600 proceeds to 610 after the feedforward torque is determined.

At 608, method 600 adjusts engine and/or motor torque based on the feedforward torque determined at 608 and the desired transmission input torque. In one example, the feedforward torque is added to the desired transmission input torque as shown in FIG. 4. The engine and/or motor are commanded to torques based on the feedforward torque. The amount of torque provided by the engine and/or motor may be based on driveline operating conditions including battery state of charge and driver demand torque. Method 600 proceeds to 610 after commanding the engine and/or motor based on the feedforward torque.

At 610, method 600 adjusts on-coming clutch application force via adjusting an on-coming clutch actuator. In one example, an on-coming clutch gradient is determined as described in FIG. 4 and the on-coming clutch actuator is adjusted based on on-coming clutch gradient feedback from the transmission input and output shafts as described in FIG. 4. Method 600 proceeds to exit after the on-coming clutch is adjusted.

At 620, method 600 judges whether or not the transmission torque converter lockup clutch (TCC) is locked. In one example, method 600 may judge that the TCC is locked based on a value of a variable in memory or a pressure of hydraulic fluid supplied to the TCC. If method 600 judges that the TCC is not locked, the answer is no and method 600 proceeds to 608. Otherwise, the answer is yes and method 600 proceeds to 622.

At 622, method 600 judges whether or not the transmission torque converter lockup clutch includes dampening springs (e.g., FIG. 3A). In one example, method 600 may judge that the TCC includes dampening springs based on a value of a variable in memory. If method 600 judges that the TCC includes dampening springs, the answer is yes and method 600 proceeds to 630. Otherwise, the answer is no and method 600 proceeds to 640.

At 640, method 600 adjusts transmission output shaft acceleration or torque gain based on an absence of TCC dampening springs. For example, gain blocks may be included in the controller shown in FIG. 5 between the output shaft acceleration/torque output of transmission 208 and block 502 and between the output shaft acceleration/torque output of transmission 208 and block 504. The gains may be adjusted responsive to the absence of dampening springs in the TCC. In this way, transmission output shaft torque/acceleration feedback may be adjusted responsive to the absence of TCC dampening springs. Method 600 proceeds to 642 after the gains are adjusted.

At 642, method 600 adjusts feedback torque modulation based on transmission output shaft acceleration/torque. As described at 502 of FIG. 5, transmission output torque or acceleration feedback adjusts on-coming clutch modulation torque (e.g., torque supplied by the motor during application of the on-coming clutch). The on-coming clutch feedback torque modulation torque is adjusted to maintain or slightly increase transmission output torque during an inertia phase (e.g., closing of the on-coming clutch) of the transmission gear shift. Method 600 proceeds to 644 after adjusting feedback torque modulation.

At 644, method 600 determines a feedback on-coming clutch error torque. The feedback on-coming clutch error torque may be determined as shown at 504 of FIG. 5. Specifically, the transmission output torque or acceleration may be subtracted from the feedback torque modulation to determine the feedback on-coming clutch error torque.

Method 600 proceeds to 646 after the feedback on-coming clutch error torque is determined.

At 646, method 600 applies the feedback on-coming clutch error torque to the desired transmission input torque. As shown at 502 of FIG. 5, the feedback on-coming clutch error torque may be added to the desired transmission input torque to provide a transmission input torque command. Method 600 proceeds to 648 after the feedback on-coming clutch error torque is applied to the desired transmission input torque.

At 648, method 600 adjusts motor torque of the motor supplying torque to the transmission base on the desired transmission input torque and the feedback on-coming clutch error torque determined at 646. The motor is commanded based on the sum of the desired transmission input torque and the feedback on-coming clutch error torque. In one example, current supplied to the motor may be adjusted via commanding current and/or voltage output of an inverter. Method 600 proceeds to exit after the motor torque is commanded.

At 630, method 600 adjusts transmission output shaft acceleration or torque gain based on a presence of TCC dampening springs in the TCC. For example, gain blocks may be included in the controller shown in FIG. 5 between the output shaft acceleration/torque output of transmission 208 and block 502 and between the output shaft acceleration/torque output of transmission 208 and block 504. The gains may be adjusted responsive to the presence of dampening springs in the TCC. In this way, transmission output shaft torque/acceleration feedback may be adjusted responsive to the presence of TCC dampening springs. Method 600 proceeds to 632 after the gains are adjusted.

At 632, method 600 adjusts feedback torque modulation based on transmission output shaft acceleration/torque. As described at 502 of FIG. 5, transmission output torque or acceleration feedback adjusts on-coming clutch modulation torque (e.g., torque supplied by the motor during application of the on-coming clutch). The on-coming clutch feedback torque modulation torque is adjusted to maintain or slightly increase transmission output torque during an inertia phase (e.g., closing of the on-coming clutch) of the transmission gear shift. Method 600 proceeds to 634 after adjusting feedback torque modulation.

At 634, method 600 determines a feedback on-coming clutch error torque. The feedback on-coming clutch error torque may be determined as shown at 504 of FIG. 5. Specifically, the transmission output torque or acceleration may be subtracted from the feedback torque modulation to determine the feedback on-coming clutch error torque. Method 600 proceeds to 636 after the feedback on-coming clutch error torque is determined.

At 636, method 600 applies the feedback on-coming clutch error torque to the desired transmission input torque. As shown at 502 of FIG. 5, the feedback on-coming clutch error torque may be added to the desired transmission input torque to provide a transmission input torque command. Method 600 proceeds to 648 after the feedback on-coming clutch error torque is applied to the desired transmission input torque.

Thus, method 600 may adjust torque input to a transmission based on the control block diagram of FIG. 4 at 608-612. Further, method 600 may adjust torque input to a transmission based on control block diagram 5 at 640-648 and 630-648. In this way, method 600 adjusts transmission input torque during transmission gear shifting inertia phase when a driveline disconnect clutch is locked or open. Additionally, method 600 adjusts transmission input torque based on if TCC dampening springs are present or not present. Consequently, hybrid vehicle transmission shifting may be improved.

The method of FIG. 6 provides for a driveline operating method, comprising: propelling a vehicle down a road via a motor in a driveline with an open disconnect clutch and a locked torque converter clutch; adjusting a torque output command of the motor via transmission output shaft feedback in response to fixed ratio transmission gear shift; and operating the motor based on the adjusted torque output command during the shift. The method of claim 1, where the transmission output shaft feedback is torque feedback. The method includes where the transmission output shaft feedback is acceleration feedback.

In some examples, the method includes where the transmission output shaft feedback adjusts a feedback on-coming clutch modulation torque. The method includes where the transmission output shaft feedback is further subtracted from the adjusted feedback on-coming clutch modulation torque to provide a feedback on-coming clutch error torque. The method includes where the feedback on-coming clutch error torque is further added to a desired transmission input torque.

In another example, the method of FIG. 6 provides for a driveline operating method, comprising: propelling a vehicle via a motor in a driveline with a disconnect clutch opened and a torque converter clutch in a locked state in a first mode; adjusting a torque output command of the motor via transmission output shaft feedback in response to a first fixed ratio transmission gear shift in the first mode; propelling the vehicle via an engine in the driveline with the disconnect clutch closed and the torque converter clutch in an unlocked state in a second mode; adjusting a torque output command of the engine or motor without transmission output shaft feedback in response to a second fixed ratio transmission gear shift in the second mode; and operating the motor based on the adjusted torque output command of the motor.

In some examples, the method includes where the driveline disconnect clutch is positioned in a driveline at a location downstream of the engine and upstream of the motor. The method includes where the motor is coupled to the engine via the driveline disconnect clutch and a dual mass flywheel. The method includes where the transmission output shaft feedback adjusts a feedback on-coming clutch modulation torque. The method includes where the transmission output shaft feedback is further subtracted from the feedback on-coming clutch modulation torque to provide a feedback on-coming clutch error torque. The method also includes where the torque output command of the engine or motor without transmission output shaft feedback is further adjusted via a feedforward transmission input torque. The method also includes where the feedforward transmission input torque is adjusted with respect to time since a gear shift is requested. The method includes where the feedforward transmission input torque is based on a transmission clutch slip gradient.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
propelling a vehicle via a motor in a driveline with an open disconnect clutch and a locked torque converter clutch;
adjusting a torque output command of the motor from a controller via transmission output shaft feedback in response to a fixed ratio transmission gear shift, the transmission output shaft feedback relayed to the controller, the controller adjusting a feedback on-coming clutch modulation torque; and
operating the motor based on the adjusted torque output command.

2. The method of claim 1, where the transmission output shaft feedback is torque feedback.

3. The method of claim 1, where the transmission output shaft feedback is acceleration feedback.

4. The method of claim 1, where the transmission output shaft feedback is further subtracted from the adjusted feedback on-coming clutch modulation torque by the controller to provide a feedback on-coming clutch error torque.

5. The method of claim 4, where the feedback on-coming clutch error torque is further added by the controller to a desired transmission input torque.

6. A driveline operating method, comprising:
propelling a vehicle via a motor in a driveline with a disconnect clutch opened and a torque converter clutch in a locked state in a first mode;
adjusting a torque output command of the motor via transmission output shaft feedback in response to a first fixed ratio transmission gear shift in the first mode;
propelling the vehicle via an engine in the driveline with the disconnect clutch closed and the torque converter clutch in an unlocked state in a second mode;
adjusting a torque output command of the engine or motor without transmission output shaft feedback in response to a second fixed ratio transmission gear shift in the second mode; and
operating the motor based on the adjusted torque output command of the motor.

7. The method of claim 6, where the driveline disconnect clutch is positioned in the driveline at a location downstream of the engine and upstream of the motor.

8. The method of claim 7, where the motor is coupled to the engine via the driveline disconnect clutch and a dual mass flywheel.

9. The method of claim 6, where the transmission output shaft feedback is relayed to the controller, and where the controller adjusts a feedback on-coming clutch modulation torque.

10. The method of claim 9, where the transmission output shaft feedback is further subtracted from the feedback on-coming clutch modulation torque by the controller to provide a feedback on-coming clutch error torque.

11. The method of claim 6, where the torque output command of the engine or motor without transmission output shaft feedback is further adjusted via a feedforward transmission input torque.

12. The method of claim 11, where the feedforward transmission input torque is adjusted with respect to time since a gear shift is requested.

13. The method of claim 12, where the feedforward transmission input torque is based on a transmission clutch slip gradient.

14. A system, comprising:
an engine;
a motor;
a disconnect clutch positioned in a driveline between the engine and the motor;
a torque converter including a lockup clutch coupled to the motor; and
a controller including executable instructions stored in non-transitory memory for adjusting a motor torque command during a first transmission gear shift in response to a transmission output shaft parameter while the lockup clutch is closed and while the disconnect clutch is open, the controller including additional instructions to not adjust the motor torque command during a second transmission gear shift in response to the transmission output shaft parameter.

15. The system of claim 14, where the output shaft parameter is output shaft acceleration.

16. The system of claim 14, where the additional instructions include instructions to open the disconnect clutch during the second transmission gear shift.

17. The system of claim 14, further comprising additional instructions to cease adjusting the motor torque command in response to the transmission output shaft parameter in response to an end of the first transmission gear shift.

18. The system of claim 16, where the additional instructions include instructions to provide a feedback adjusted transmission input torque responsive to the transmission output shaft parameter.

* * * * *